US012565252B2

(12) United States Patent
Ecker et al.

(10) Patent No.: US 12,565,252 B2
(45) Date of Patent: Mar. 3, 2026

(54) STAIR NAVIGATOR WITH HYDRAULIC BRAKE

(71) Applicant: Magline, Inc., Standish, MI (US)

(72) Inventors: Gregory Paul Ecker, Midland, MI (US); Brandon Gigliotti, Midland, MI (US); Nathan Charles Vigneaux, Bay City, MI (US); Connor Jacob Jacoby, Unionville, MI (US); Dylan Ricky, Gladwin, MI (US); Zachariah Tyler Morris, Chesterfield, MI (US); Chad D. Winters, Bay City, MI (US)

(73) Assignee: Magline, Inc., Standish, MI (US)

(*) Notice: Subject to any disclaimer, the term of this patent is extended or adjusted under 35 U.S.C. 154(b) by 1040 days.

(21) Appl. No.: 17/682,283

(22) Filed: Feb. 28, 2022

(65) Prior Publication Data

US 2022/0274637 A1 Sep. 1, 2022

Related U.S. Application Data

(60) Provisional application No. 63/154,132, filed on Feb. 26, 2021.

(51) Int. Cl.
 B62B 5/04 (2006.01)
 B62B 1/12 (2006.01)
 B62B 5/00 (2006.01)
(52) U.S. Cl.
 CPC .............. B62B 5/0452 (2013.01); B62B 1/12 (2013.01); B62B 5/0036 (2013.01); B62B 5/0066 (2013.01); B62B 2301/256 (2013.01)

(58) Field of Classification Search
 CPC ........................................................ B62B 1/12
 See application file for complete search history.

(56) References Cited

U.S. PATENT DOCUMENTS

| | | | | |
|---|---|---|---|---|
| 1,105,379 A | * | 7/1914 | Schulze ................. | A61G 5/066 |
| | | | | 280/47.38 |
| 3,788,659 A | * | 1/1974 | Allen ........................ | B62B 1/12 |
| | | | | 280/654 |
| 5,269,544 A | * | 12/1993 | Park ........................ | B62B 5/025 |
| | | | | 280/42 |
| 5,938,396 A | * | 8/1999 | Audet ...................... | B25H 3/00 |
| | | | | 414/490 |

(Continued)

OTHER PUBLICATIONS

Melrose KIWI Concept Chairs USA, Pull to Lock Brakes, 2022, http://www.melrosewheelchairs.com.

(Continued)

*Primary Examiner* — Alentin Neacsu
*Assistant Examiner* — Hosaam Shabara
(74) *Attorney, Agent, or Firm* — The Dobrusin Law Firm, P.C.

(57) ABSTRACT

An improved hand truck having a stair navigator and brake system. The system includes a stair track, or stair navigator, having improved features allowing for the hand truck to navigate stairs more easily. The stair track is in connection with a brake, particularly a hydraulic brake system, allowing the user to stop movement of the belt of the stair climber while in use. The hand truck is an improved hand truck having an improved stair track, a brake system and a mechanism allowing for deployment and latching.

13 Claims, 7 Drawing Sheets

(56)     References Cited

U.S. PATENT DOCUMENTS

| | | | | |
|---|---|---|---|---|
| 8,100,430 | B2 * | 1/2012 | Meyers | B62B 1/12 |
| | | | | 280/30 |
| 8,439,371 | B1 * | 5/2013 | Vazquez | B62B 5/02 |
| | | | | 280/5.22 |
| 9,321,471 | B1 * | 4/2016 | Gedeon-Janvier | B62B 3/02 |
| 10,479,385 | B2 * | 11/2019 | Collibault | B62B 1/125 |
| 11,472,461 | B2 * | 10/2022 | Mendoza | B62B 1/008 |
| 11,535,291 | B2 * | 12/2022 | Hill | B62B 1/12 |
| 2009/0250889 | A1 * | 10/2009 | Palmore | B62B 5/06 |
| | | | | 280/47.21 |

OTHER PUBLICATIONS

Ferno EZ Glide, 2016, https://www.com/ferno/media/us/marketing/sales-sheet-ezglide-stair-chair-v2.pdf?ext=.pdf.

Destaco Clamp (227-U), 2016, https://www.destaco.com/products/catalog/227-U?cdskeys=227-u.

Latch Type Toggle Clamps, Over-Center Latch, Morsetto A. Ginocchiera, May 2016.

Destaco, Pull-Action Latch Clamps, 2016 https://www.destaco.com/pull-action-latch-clamps.

* cited by examiner

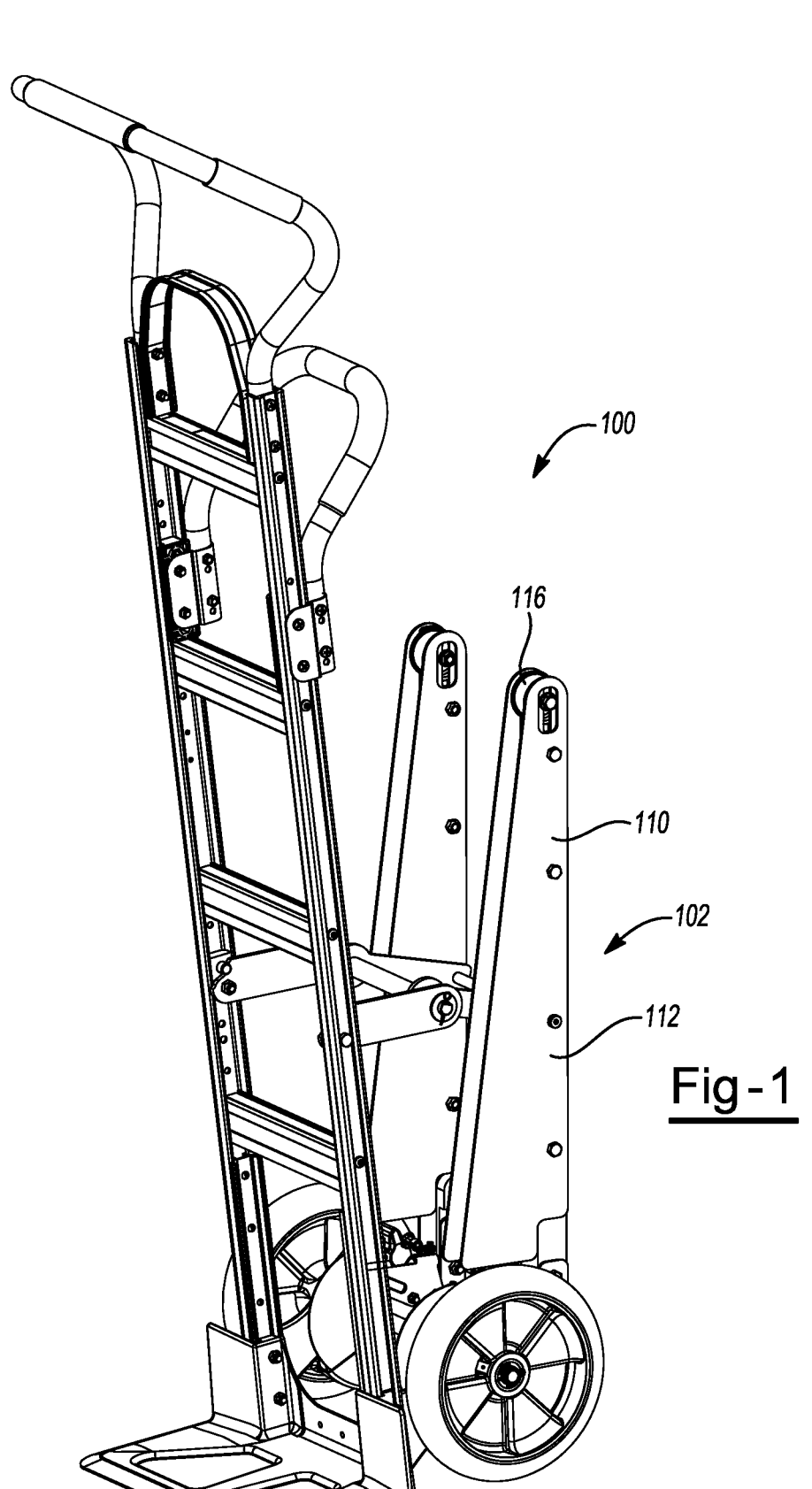
_Fig-1_

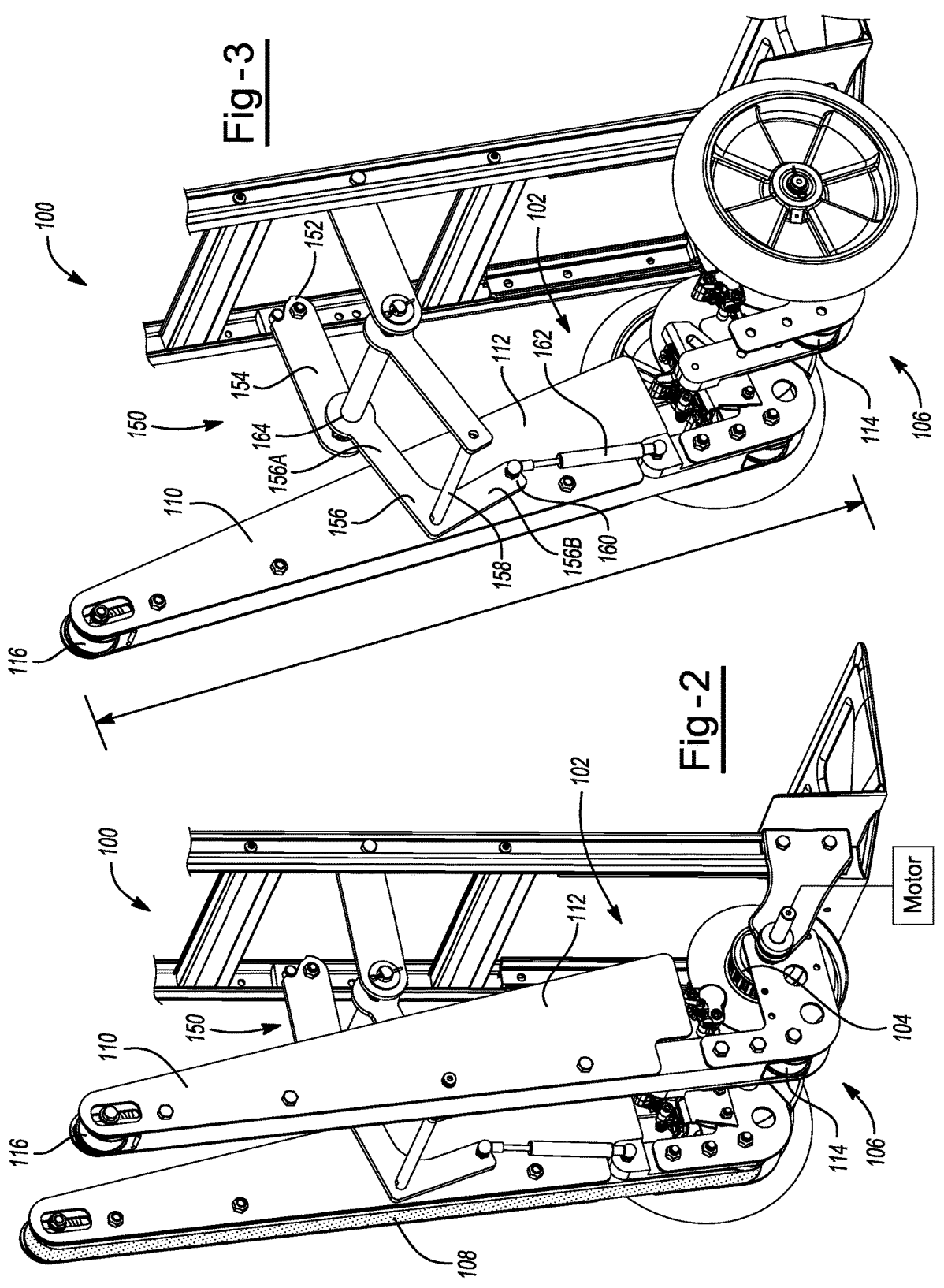

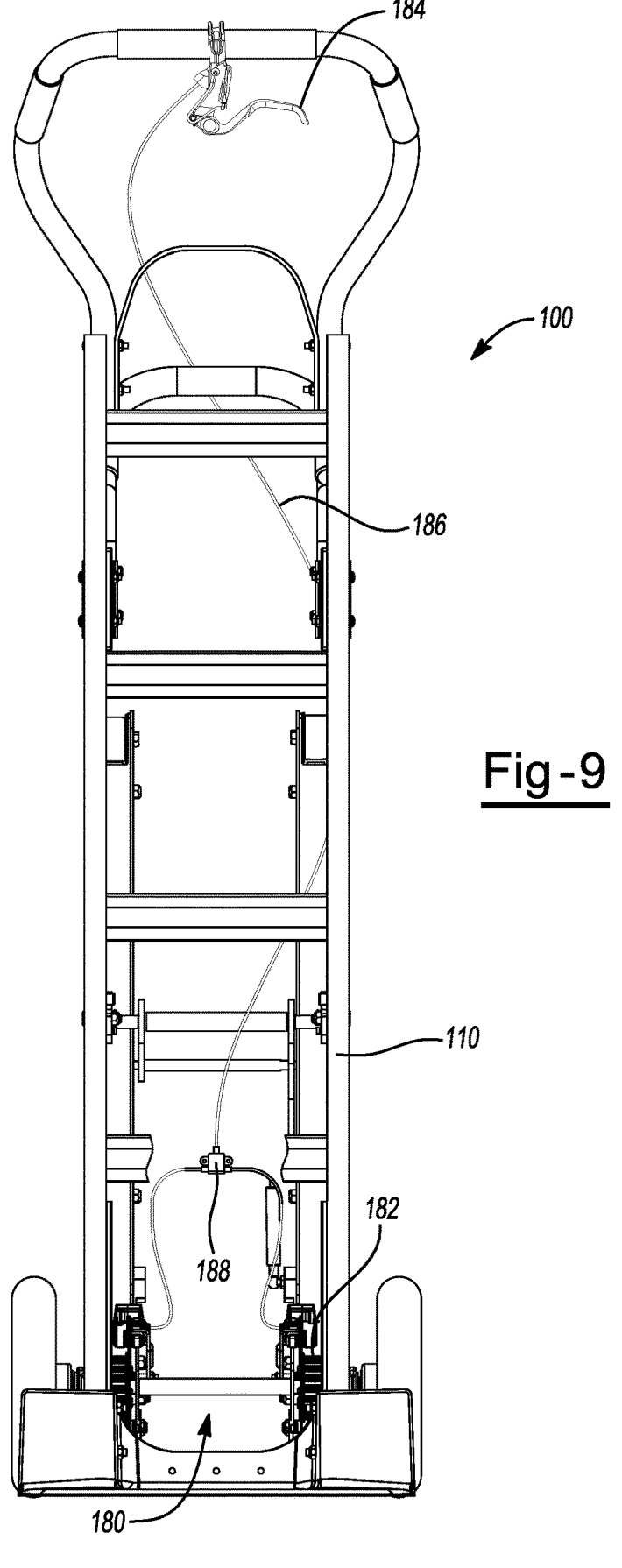
_Fig-9_

STAIR NAVIGATOR WITH HYDRAULIC BRAKE

CROSS REFERENCE TO RELATED APPLICATIONS

This application claims priority and benefit to Provisional Patent Application Ser. No. 63/154,132 filed on Feb. 26, 2021.

TECHNICAL FIELD

The present disclosure relates generally to container closures. More specifically, the present disclosure relates to an improved stair climber with the ability to apply friction to a stair tread to control a load on stairs.

BACKGROUND

While previously known stair tracks or stair climbers work reasonably well, there are several drawbacks. Traditional stair climbers use a friction pully system which limits smooth movement to only a specific load range. Further, numerous components of traditional stair climber systems are custom-made and expensive to manufacture.

Accordingly, there exists a need in the art to provide an improved hand truck with increased mobility both navigating stairs and on flat ground.

SUMMARY

An improved hand truck having a stair navigator and brake system. The system includes a stair track assembly (having 2 mirrored tracks to help balancing), or stair navigator, having improved features allowing for the hand truck to navigate stairs more easily. The stair track assembly (comprised of two individual stair tracks) is in connection with a brake, particularly a hydraulic brake system, allowing the user to stop movement of the belt of the stair climber while in use. The hand truck is an improved hand truck having an improved stair track assembly, a brake system and a mechanism allowing for deployment and latching.

A stair navigator assembly for use on a hand truck, the stair navigator having two track subassemblies each having a pulley system and a belt, the pulley system having a first pulley positioned at the top of the at least one track subassembly, and a second pulley and a third pulley positioned at an opposite bottom position on the at least one track subassembly, wherein the first pully, second pulley, and third pulley are configured to allow for separate drive pulleys and idler pulleys to improve movement of the stair climber assembly.

Each track subassembly may include a protective cover extending between the first pulley and the second and third pulleys. In some embodiments the length of the at least one track subassembly ranges between 28-32 inches. In some embodiments, a motor is used to power at least one of the first pulley, the second pulley, and/or the third pulley. In many embodiments, the motor is connected to the hand truck.

A hand truck with a first stair track and a second stair track connected thereto, the hand truck having a brake system, the brake system includes a first brake actuator and a second brake actuator, the first brake actuator connected to the first stair track, the second brake actuator connected to the second stair track, and a cable system, the cable system having a cable configured to communicate breaking desirability to the brake system; the cable having a split line having a first split section and a section split section thereby providing for independent control of the first stair track and the second stair track. In some embodiments, the first brake actuator and/or the second brake actuator are disengaged, the wheels are permitted to free wheel allowing for spinning in either direction. In some embodiments, the brake system is hydraulic.

A hand truck having a frame, the hand truck having a stair climber assembly, the stair climber assembly retracted and deployed by means of a folding an extension latch mechanism, the mechanism having a first link pivotally connected to the frame of the hand truck, a cam connected to the hand truck, the first link configured to bias against and to connect with the first link, a second link connected to the first link, and a spring connected to the second link, the hydraulic link configured to apply force to move the links between a stowed to an extended position to deploy and store the stair climber assembly.

In some embodiments, first link further includes an indent configured to connect to the cam. The second link may include a first arm and a second arm, the first arm and the second arm arranged in a generally perpendicular to each other. The spring may be connected between the distal end of the second arm and the stair climber assembly. In some embodiments, in a locked position, the cam rests within the indent. In some embodiments, when in an extended position, the cam disengages from the indent. In some embodiments, when in an extended position, the spring is compressed. In some embodiments, both the first link and the second link are straight. In some embodiments, the spring extends between the first spring and the second spring. In some embodiments, when in a stowed position, the spring is compressed.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1 depicts a perspective view of the hand truck as disclosed herein according to one or more embodiments shown and described herein;

FIG. 2 depicts a perspective view of the stair track (showing the belt) of the hand truck as disclosed herein according to one or more embodiments shown and described herein;

FIG. 3 depicts a perspective view of the stair track of the hand truck as disclosed herein according to one or more embodiments shown and described herein;

FIG. 9 depicts a rear view of the hand cart and brake system as disclosed herein according to one or more embodiments shown and described herein;

DETAILED DESCRIPTION

Figure 5:
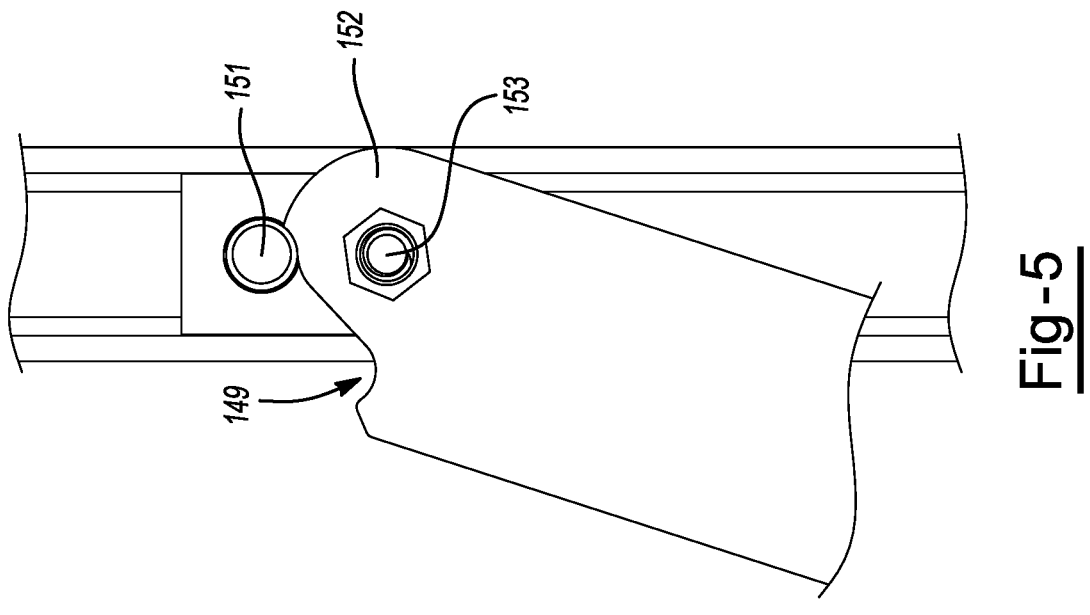
FIG. 5 depicts a close-up perspective view of the latch in an closed position as disclosed herein according to one or more embodiments shown and described herein.
Figure 4:
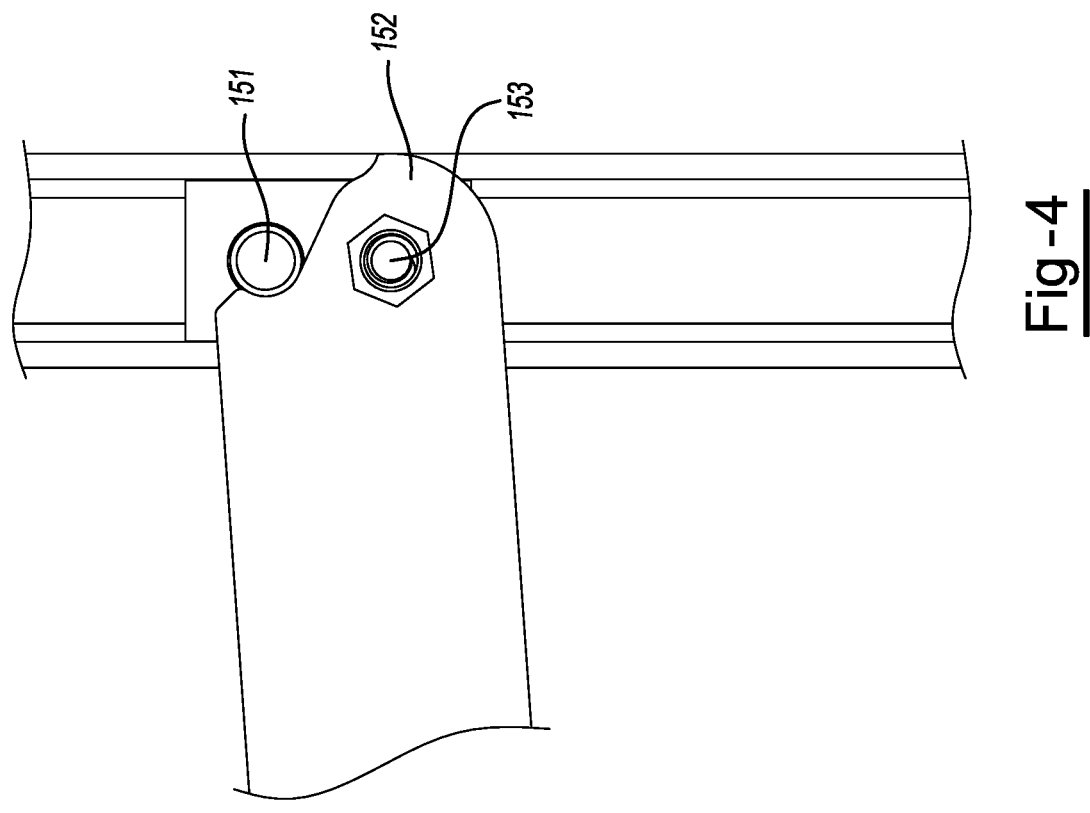
FIG. 4 depicts a close-up perspective view of the latch in an extended position as disclosed herein according to one or more embodiments shown and described herein.

While several points of novelty are discussed herein, the main apparatus and system described herein is an improved hand truck having a stair navigator and brake system. The system includes a stair track, or stair navigator, having improved features allowing for the hand truck to more easily navigate stairs. The stair track assembly (having two stair tracks) is in connection with a brake, particularly a hydraulic brake system, allowing the user to stop movement of the belt of the stair climber while in use. FIG. 1 illustrates a perspective view of an improved hand truck having an improved stair track, a brake system and a mechanism allowing for deployment and latching.

Stair Track (or Stair Navigator)

FIGS. 1-3 disclose and illustrate an improved stair navigator including an improved pully system. The stair climber system 102 generally includes a set of stair climbers 110 each having a flat belt 108. Each stair climber includes three pulleys 104, 114, 116. This three-pulley system (versus a 2-pully system) is configured to allow for separate drive pulleys and idler pulleys. In some embodiments, the distance between the two bottom pulleys is altered to use tracks at different angles. A protective cover 112 protects the tracks from debris and belt misalignment. The protective cover 112 also allows for placement of logos and other advertising on the commercial product. The tracks are strategically sized, in length width and depth, to allow for contacting of two stairs at once. In this embodiment, the length of the tracks is ideally 30 inches+/−0.75"—although this number may vary.

The outside surface of the belt 108 is, in some embodiments, flat with neoprene rubber as a surface for an optimal coefficient of friction. In other embodiments, the outside surface of the belt includes teeth to improve traction. However, other similar materials having equivalent properties may also be used. The belt 108 may have cogs/teeth on the inside to engage the pulleys. The belt tension can be controlled (the amount of force between different pully elements). It may be controlled independently between the tracks. Each of the climbers or navigators is capable of being independently controlled. The brake however is not independent. If the brake trigger is pulled, both belts should stop rotating. Only when the brake is not applied, can the belts rotate independently.

As shown in FIG. 2, a motor may be utilized to drive the belt and/or stop the belt. Further, the bottom mounting bracket includes a radius to mimic that of the tracks. A rotor is mounted to the pulley on the axle. A bearing will be between the inside diameter of the pulley and the axle, allowing for the track to be engaged without the wheels engaging. If this were not the case, the track would spin while using the hand truck on level ground, which is not the intention.

Stair Track Brake System

FIG. 9 depicts a hydraulic brake system for the stair track disclosed herein. The hand truck 100 includes a brake system 180. In this embodiment, the brake system 180 is a cable brake system or a hydraulic brake system. In the embodiment shown herein, the brake system includes a handle 184 allowing the user to engage the brake system to brake the belts 110 on the stair climber. A cable 186 communicates the breaking desirability to the brake system, such as illustrated at 182. The system is a split line system so that tracks are braked simultaneously which is important when turning and curving on stairs or when one track loses contact with the stair. Each track/belt has its own brake caliper. A single squeeze is expected to stop/resist both belts simultaneously. The brake trigger is attached to a section of line that runs down to the manifold block. The line then splits on either side and runs down to the calipers. The calipers consist of brake pads, which are compressed when the trigger is pulled and causes the hydraulic brake fluid to apply hydraulic pressure to the pads. The pads pinch the disk, shown in the "caliper mount" image. When the disks are pinched, this is what applies the braking force to the rotating pulley which the belts spin on.

This is already an existing brake system and used on other products of ours as well as the bicycle industry. However, the thing that makes it vary, is that we are using it in parallel with the 3-pulley track system. When the brake is applied, the user can manually control the speed at which the pulleys rotate, which in turn, controls the belt rotating up and down the stairs. This then acts as a descend control and an ascend stop for the user to reposition themselves. The mechanical gain with the master cylinder or brake system is important to reduce the amount of bodily strain when controlling maximum load of the hand truck. When the brake force is not applied, the tracks free wheel in both directions. This system provides for optimum control since the user can apply the brakes infrequently during use or can stop the hand truck on a step-by-step basis.

Folding Latch and Extension Mechanism

FIGS. 2-8 and 10-12 depict (multiple embodiments) the latching and extension mechanism for use with the stair track disclosed herein. FIG. 3 generally depicts the hand truck 100 having a latching and extension mechanism 150. The latching and extension mechanism 150 includes a latch bar to deploy and retract the track system. A gas shock 162 in connection with a system of links, pivot points and cams enable the stair track 110 to be retracted when not in use and deployed when in use as necessary.

The latch design does not require a release pin or any other detent method before moving the folding mechanism. The linkage system moves over-center again stay over center so that the cam is stable in either end travel position, positively locking in both the deployed and retracted positions. When the tracks are deployed, the mechanism angles the tracks to accommodate many angles so as to dictate proper center of gravity of the load and to provide ergonomic placement of the operator handle.

Figures 6, 7, 8:
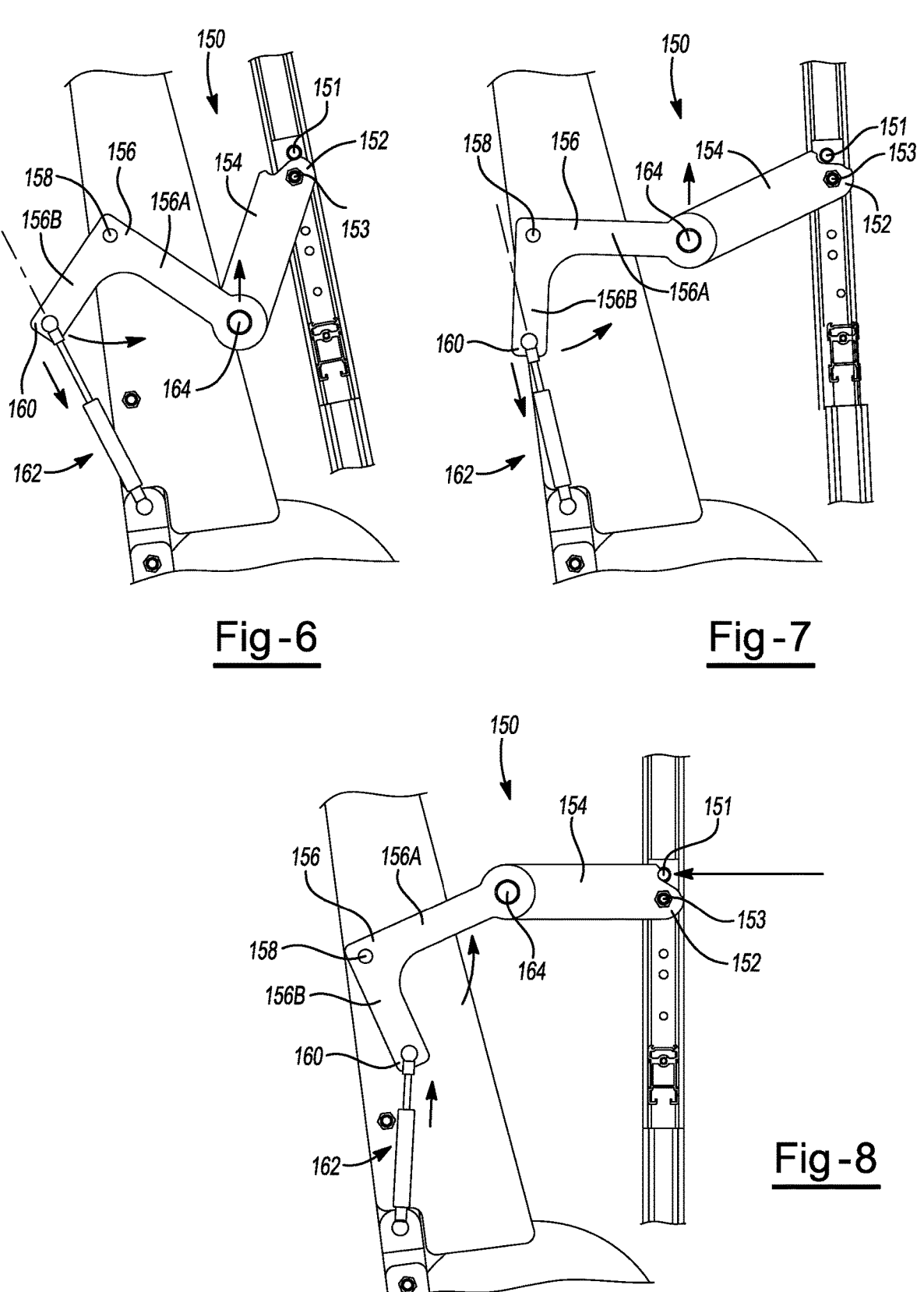
FIG. 6 depicts a close-up view of the mechanism in a closed position as disclosed herein according to one or more embodiments shown and described herein.
FIG. 7 depicts a close-up view of the mechanism in a partially open position moving towards fully extended as disclosed herein according to one or more embodiments shown and described herein.
FIG. 8 depicts a close-up view of the mechanism in an extended position as disclosed herein according to one or more embodiments shown and described herein.

FIG. 7 depicts the latching and extension mechanism 150 in an open and deployed position. FIG. 8 depicts a close-up view also in the deployed position. The link 152 connect to the frame of the hand truck at a pivot point 153. A cam 151 connect to the link 152 when in a deployed position. The link

152 connect to a second pivot point and arm 164. A link 156 having a first arm 156A and a second arm 156 B connect to the pivot 164. The second arm 156 B connects to a hydraulic spring 162. A corner point of the link 156 connects to a pivot point 158 allowing the link 156 to pivot about the pivot point 158.

FIG. 6 depicts the latching hand extension mechanism 150 in a closed or retracted position. In this position, the track is in upright position to allow for better maneuverability when not on the stairs. FIG. 6 shows the location of the gas spring 162 in the closed position, the gas spring 162 is in its extended position, locking the tracks closed. Because of the spring 162 and the cam pushing over center, the latching and extension mechanism is stable in both the deployed and retracted positions.

FIGS. 6-8 illustrate that as the pivot rod moves up (moved by user), the top gas spring 162 connection point is driven forward and the tracks are pushed away from the frame. The gas spring 162 compresses as the user continues to pull up on the pivot bar. The arrows depict the direction the gas spring is applying force.

The pivot rod 164 being moves up, eventually causing the gas spring 162 to be aligned with its center as shown. At this location, the gas spring 162 is at its max compressed state. The small gas spring cylinder 162 applies pressure to one of the members connecting the track to the hinge point. This ensures that the latch does not collapse during stair glide operation.

As the gas spring 162 moves past the center point it begins to extend and continues to force the tracks away from the frame. The stoppers at the top prevent the continuation of the movement, locking the track in a deployed position.

Other various improvements include the ability to provide for modularity of the handles, wheels, nose . . . etc. The shape and placement of the handle promotes upright usage and the handle itself is adjustable.

Figure 10:
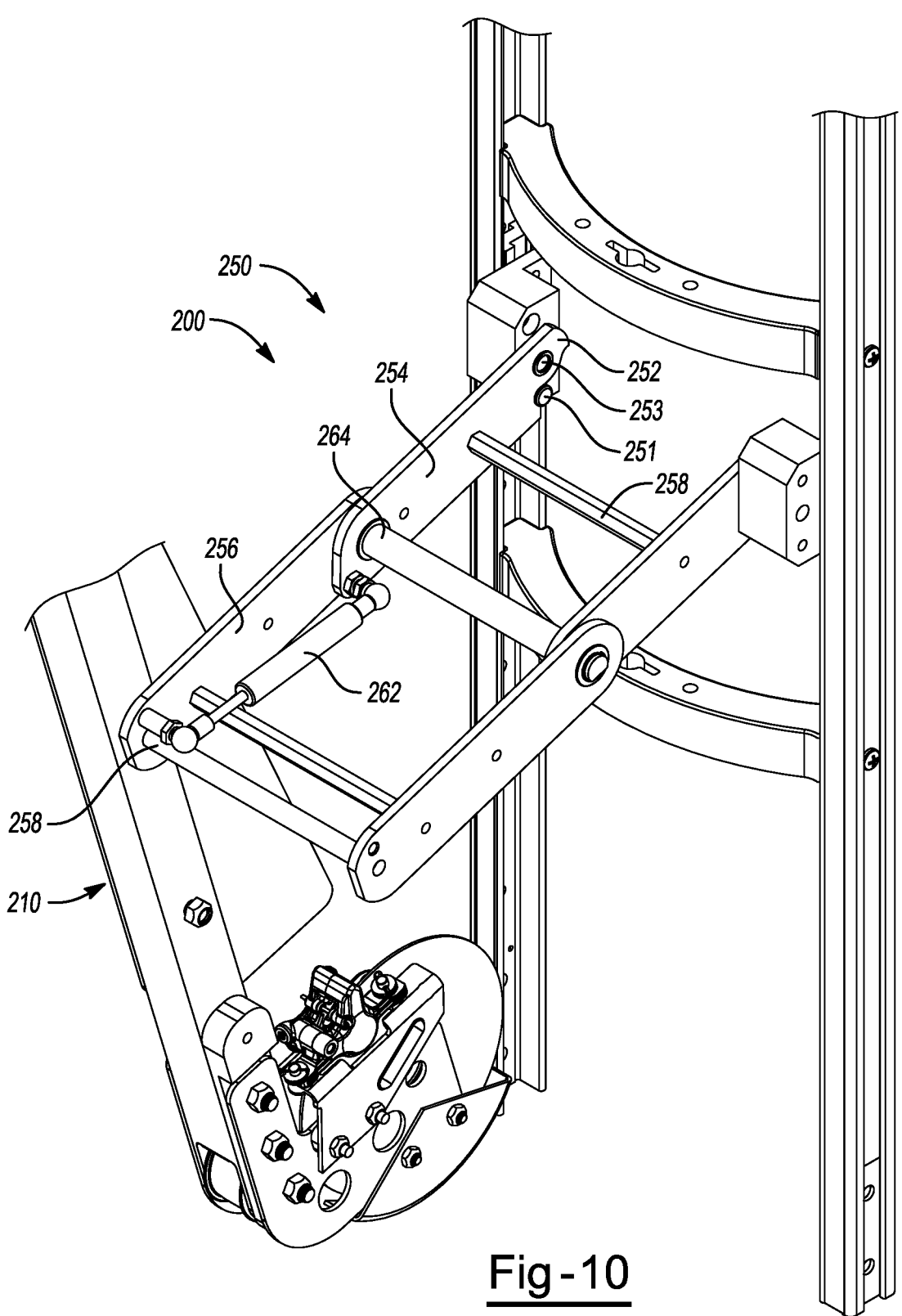
FIG. 10 depicts a perspective view of an alternative embodiment latch and extension mechanism as disclosed herein according to one or more embodiments shown and described herein.
Figures 11, 12:
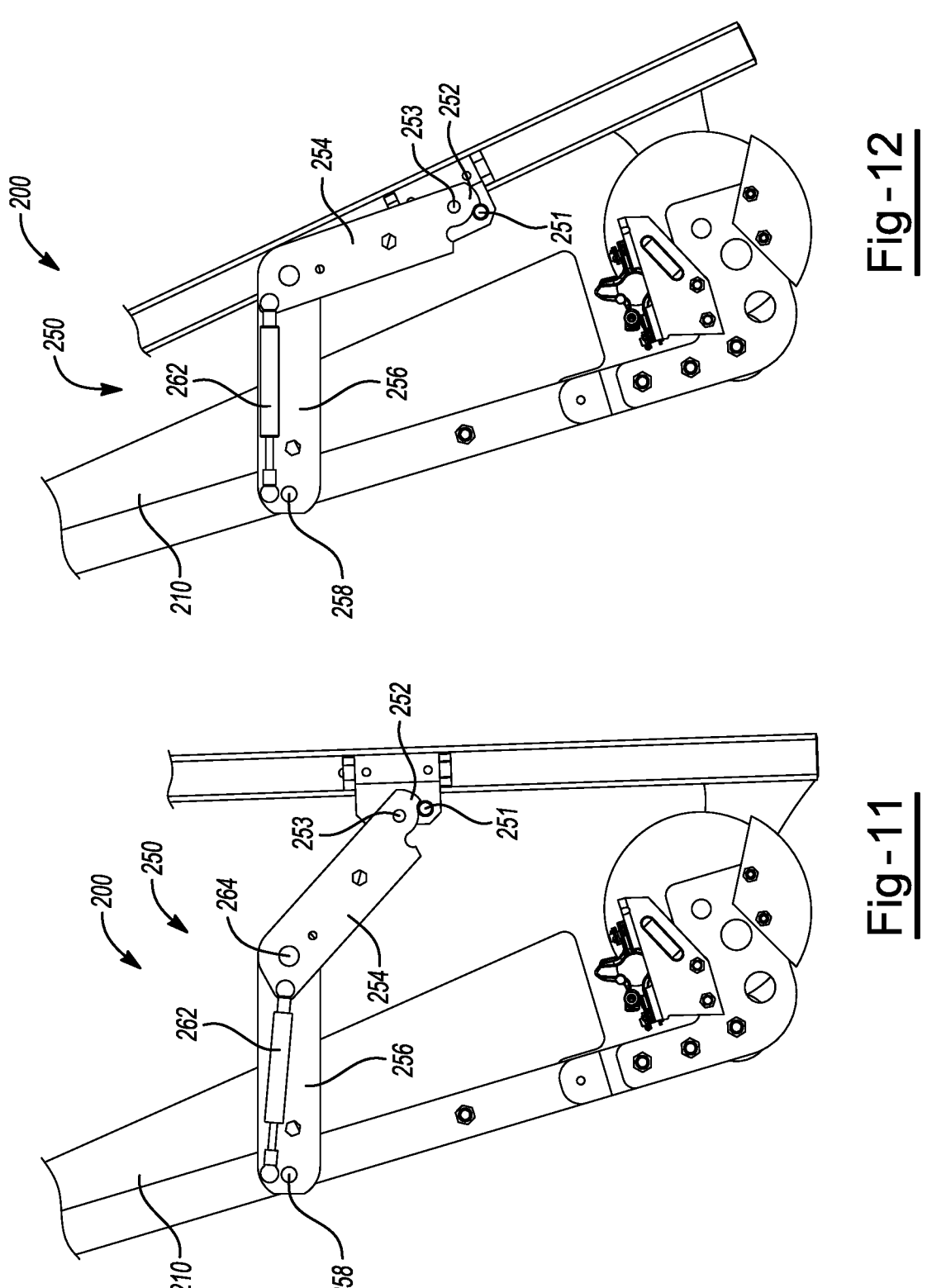
FIG. 11 depicts a side view of an alternative embodiment latch and extension mechanism in an open and extended position as disclosed herein according to one or more embodiments shown and described herein.
FIG. 12 depicts a side view of an alternative embodiment latch and extension mechanism in an closed position as disclosed herein according to one or more embodiments shown and described herein.

FIGS. 10-12 depict an alternative embodiment of the link system as illustrated in FIGS. 6-8. FIGS. 10-12 depict an alternative embodiment of the latching and extension mechanism for use with the stair track disclosed herein. FIG. 10 generally depicts the hand truck 200 having a latching and extension mechanism 250. The latching and extension mechanism 250 includes a latch bar to deploy and retract the track system. A gas shock 262 in connection with a system of links, pivot points and cams enable the stair track 210 to be retracted when not in use and deployed when in use as necessary.

The latch design does not require a release pin or any other detent method before moving the folding mechanism. The linkage system moves over-center again stay over center so that the cam is stable in either end travel position, positively locking in both the deployed and retracted positions. When the tracks are deployed, the mechanism angles the tracks to accommodate many angles so as to dictate proper center of gravity of the load and to provide ergonomic placement of the operator handle.

FIG. 11 depicts the latching and extension mechanism 250 in an open and deployed position. FIG. 12 depicts a close-up view also in the deployed position. The link 252 connect to the frame of the hand truck at a pivot point 253. A cam 251 connect to the link 252 when in a deployed position. The link 252 connect to a second pivot point and arm 264. A link 256 also connected to the pivot point 264. The link 256 connects to a hydraulic spring 262. The hydraulic spring 262 connected to the link 254 at the other end. Accordingly, in this embodiment, the hydraulic spring 262 connects between the link 254 and the link 265 and extends and compresses as the links 254, 256 as the links bend. The small gas spring 262 cylinder applies pressure to one of the members connecting the track to the hinge point. This ensures that the latch does not collapse during stair glide operation.

FIG. 12 depicts the latching hand extension mechanism 250 in a closed or retracted position. In this position, the track is in upright position to allow for better maneuverability when not on the stairs.

FIGS. 11-12 illustrates that as the pivot rod moves up (moved by user), the top gas spring 262 connection point is driven forward and the tracks are pushed away from the frame. The gas spring 262 compresses as the user continues to pull up on the pivot bar 258.

The pivot rod 264 being moved up, eventually causing the gas spring 262 to be aligned with its center as shown. At this location, the gas spring 262 is at its max compressed state.

As the gas spring 262 moves past the center point it begins to extend and continues to force the tracks away from the frame. The stoppers at the top prevent the continuation of the movement, locking the track in a deployed position.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

It is noted that the terms "substantially" and "about" may be utilized herein to represent the inherent degree of uncertainty that may be attributed to any quantitative comparison, value, measurement, or other representation.

These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consist of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

While particular embodiments have been illustrated and described herein, it should be understood that various other changes and modifications may be made without departing from the spirit and scope of the claimed subject matter.

Moreover, although various aspects of the claimed subject matter have been described herein, such aspects need not be utilized in combination.

It is therefore intended that the appended claims (and/or any future claims filed in any Utility application) cover all such changes and modifications that are within the scope of the claimed subject matter.

Moreover, although various aspects of the claimed subject matter have been described herein, such aspects need not be utilized in combination.

It is therefore intended that the appended claims cover all such changes and modifications that are within the scope of the claimed subject matter.

We claim:

1. A hand truck having a frame, the hand truck having a stair climber assembly, the stair climber assembly retracted and deployed by means of a folding an extension latch mechanism, the mechanism comprising:
  a first link directly and pivotally connected to the frame of the hand truck;
  a cam connected to the hand truck, the cam configured to bias against and to connect with the first link;
  a second link directly and pivotally connected to the first link; and
  a spring connected to the second link, the spring configured to apply force to move the links between a stowed to an extended position to deploy and store the stair climber assembly.

2. The hand truck of claim 1 wherein the first link further includes an indent configured to connect to the cam.

3. The hand truck of claim 1 wherein the second link includes a first arm and a second arm, the first arm and the second arm are integrally formed and arranged generally perpendicular to each other.

4. The hand truck of claim 3 wherein the spring is connected between the distal end of the second arm and the stair climber assembly.

5. The hand truck of claim 2 wherein when in a locked position, the cam rests within the indent.

6. The hand truck of claim 2 wherein when in an extended position, the cam disengages from the indent.

7. The hand truck of claim 3 wherein when in an extended position, the spring is compressed.

8. The hand truck of claim 1 wherein both the first link and the second link are straight.

9. The hand truck of claim 8 wherein the spring extends between the first link and the second link.

10. The hand truck of claim 9 wherein when in a stowed position, the spring is compressed.

11. A hand truck having a frame, the hand truck having a stair climber assembly, the stair climber assembly retracted and deployed by means of a folding an extension latch mechanism, the mechanism comprising:
  a first link pivotally connected to the frame of the hand truck;
  a cam connected to the hand truck, the cam configured to bias against and to connect with the first link;
  a second link pivotally connected to the first link; and
  a spring connected to the second link, the spring configured to apply force to move the links between a stowed to an extended position to deploy and store the stair climber assembly;
  wherein the second link includes a first arm and a second arm, the first arm and the second arm are integrally formed and arranged generally perpendicular to each other; and
  wherein the spring is connected between the distal end of the second arm and the stair climber assembly.

12. A hand truck having a frame, the hand truck having a stair climber assembly, the stair climber assembly retracted and deployed by means of a folding an extension latch mechanism, the mechanism comprising:
  a first link pivotally connected to the frame of the hand truck;
  a cam connected to the hand truck, the cam configured to bias against and to connect with the first link;
  a second link pivotally connected to the first link; and
  a spring connected to the second link, the spring configured to apply force to move the links between a stowed to an extended position to deploy and store the stair climber assembly;
  wherein the first link further includes an indent configured to connect to the cam; and
  wherein when in an extended position, the cam disengages from the indent.

13. A hand truck having a frame, the hand truck having a stair climber assembly, the stair climber assembly retracted and deployed by means of a folding an extension latch mechanism, the mechanism comprising:
  a first link pivotally connected to the frame of the hand truck;
  a cam connected to the hand truck, the cam configured to bias against and to connect with the first link;
  a second link pivotally connected to the first link; and a spring connected to the second link, the spring config-
ured to apply force to move the links between a stowed
to an extended position to deploy and store the stair
climber assembly;

wherein both the first link and the second link are straight; 5
and wherein the spring extends between the first link and the
second link.

\* \* \* \* \*